United States Patent [19]
Loetz-Dauer et al.

[11] Patent Number: 5,877,624
[45] Date of Patent: Mar. 2, 1999

[54] CONTACTLESS ROTATIONAL SPEED MEASUREMENT ARRANGEMENT UTILIZING RADICALLY ALIGNED ROTATING MAGNETS

[75] Inventors: Volker Loetz-Dauer, Wiesbaden; Thomas Kettner, Netzbach, both of Germany

[73] Assignee: Elster Produktion GmbH, Mainz-Kastel

[21] Appl. No.: 318,641

[22] PCT Filed: Mar. 26, 1993

[86] PCT No.: PCT/EP93/00743

§ 371 Date: Oct. 6, 1994

§ 102(e) Date: Oct. 6, 1994

[87] PCT Pub. No.: WO93/21535

PCT Pub. Date: Oct. 28, 1993

[30] Foreign Application Priority Data

Apr. 8, 1992 [DE] Germany .................... 42 11 704.6

[51] Int. Cl.[6] ............ G01P 3/487; G01P 3/481; G01P 7/30

[52] U.S. Cl. ............. 324/174; 324/207.22; 324/235

[58] Field of Search ............. 324/207.15, 207.22, 324/207.25, 174, 260, 262, 207.13, 207.12, 235

[56] References Cited

U.S. PATENT DOCUMENTS

| | | | |
|---|---|---|---|
| 3,832,634 | 8/1974 | Galea | 324/174 |
| 4,525,670 | 6/1985 | Miyagawa et al. | 324/207.25 |
| 4,646,088 | 2/1987 | Inoue | 324/207.25 |
| 4,772,813 | 9/1988 | Mohri et al. | 324/260 |

*Primary Examiner*—Walter E. Snow
*Attorney, Agent, or Firm*—Blakely Sokoloff Taylor & Zafman

[57] ABSTRACT

Measuring arrangement for contactless measurement of rotational speed. The measuring arrangement operates using a stationary pulse wire sensor (5) which is activated by the magnetic fields of several revolving, radially aligned magnets (4). The rotational speed of a component (3a) arranged on a shaft (3) is detected by each pulse being triggered in the pulse wire sensor (5) by two opposite poles (N, S) lying at an axial distance to each other. The measuring arrangement provides reliable measurements irrespective of the rotational speed, in particular in the lower measuring range.

2 Claims, 1 Drawing Sheet

CONTACTLESS ROTATIONAL SPEED MEASUREMENT ARRANGEMENT UTILIZING RADICALLY ALIGNED ROTATING MAGNETS

BACKGROUND INFORMATION

The present invention relates to an arrangement for contactless measurement of the rotational speed of a component arranged on a shaft with several revolving magnets in whose magnetic fields a stationary pulse wire sensor is arranged.

Such a measuring arrangement is known from practice, in which a pulse wire sensor is activated by the magnetic fields of several magnets which are arranged on the circumference of a rotating component. A pulse is triggered when the components of the magnetic fields parallel to the sensor exceed a certain minimum value.

According to the known laws of induction moving magnetic fields generate in their vicinity in conducting surfaces a changing magnetic flux which generates eddy currents. Similar to mechanical bearing friction such eddy currents represent an electrical stray current.

In certain applications, the eddy currents have a disruptive effect. For example, with turbine gas flowmeters there is only a very small driving torque to rotate the metering wheel at minimum flow. Therefore, the eddy currents lead to measuring errors in the lower measuring range.

Therefore, the object of the present invention was to develop a measuring arrangement of the aforementioned type which provides reliable measurements irrespective of the rotational speed, particularly in the lower measuring range.

SUMMARY

The superposition of the individual magnetic fields of the magnets of alternatingly opposite polarity results in a large field component parallel to the axis of the pulse wire sensor, overall the stray field outwards being small. A small magnetic field strength can therefore be selected.

The measuring arrangement is unaffected by rotational speed, i.e. a minimum rotational speed is not required, therefore the measuring range is large.

The position of the pulse wire sensor relative to the magnets can be easily optimised to the pulse height. The same applies to the distance between the magnets.

Without any electricity supply the measuring arrangement provides a high pulse voltage which can be transmitted free from interference to an electronic evaluation and display system.

It is particularly advantageous to use two bar-shaped magnets which are aligned parallel to each other.

A further advantageous embodiment of the present invention consists in the magnets being embedded in the shaft of the component.

This measure ensures that the area interspersed by the magnetic flux is kept to a minimum. The arrangement ensures the pulse wire sensor is actuated with position tolerance being uncritical and that the eddy currents are simultaneously minimised.

Combinations of the inventive features which deviate from the combinations mentioned hereinabove are deemed to have been disclosed as essential to the present invention.

BRIEF DESCRIPTION OF THE DRAWINGS

The present invention is now explained in greater detail using one application of the inventive measuring arrangement together with the attached drawing.

DETAILED DESCRIPTION

Figure 1:
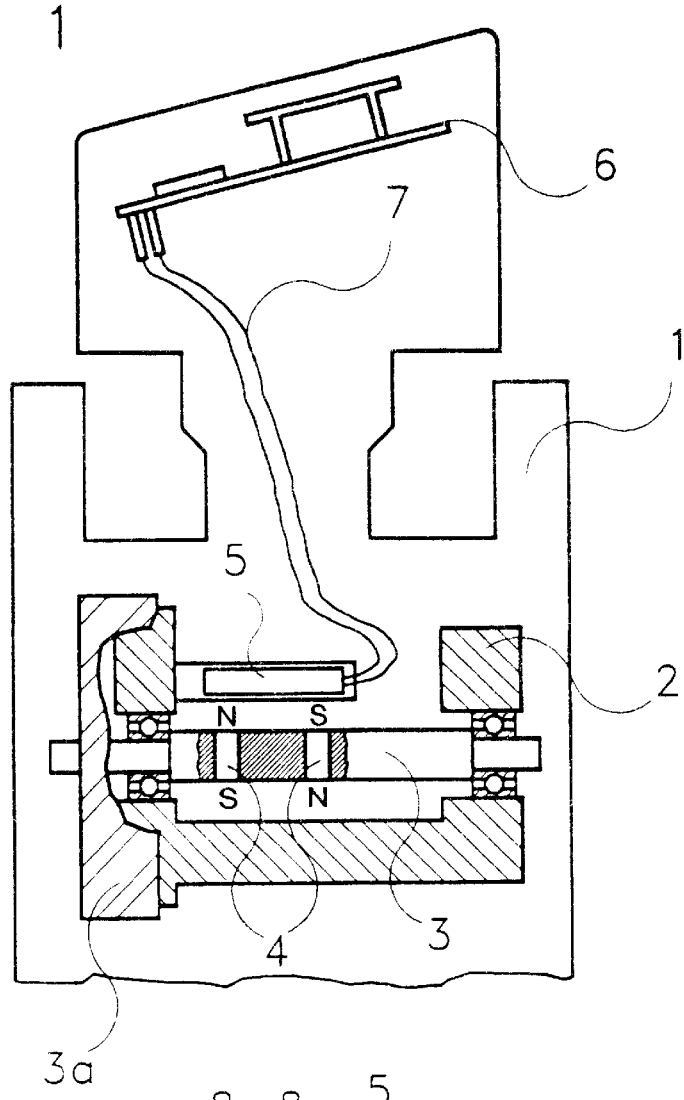
FIG. 1 shows a section through a measuring arrangement in a turbine gas flowmeter.

Referring to FIG. 1, a bearing body 2 is accommodated in a housing 1, said bearing body carrying a measuring wheel shaft 3 of a measuring wheel 3a. Two bar-shaped magnets 4 are embedded in the measuring wheel shaft 3 at a distance to each other such that their poles N, S are radially aligned. The magnets 4 are substantially parallel to each other and have opposite polarity.

A pulse wire sensor 5 is arranged parallel to the rotational axis of the measuring wheel shaft 3 in a position to the bar-shaped magnets 4 which is optimised to the pulse height. The pulse wire sensor 5 is connected to an electronic evaluation and display system 6 by means of lines 7.

Figure 2:
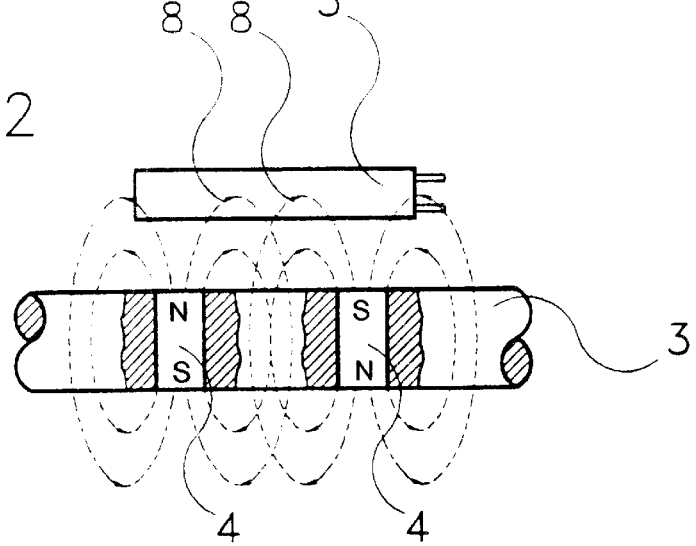
FIG. 2 shows a schematic of the form of the magnetic field of the measuring arrangement.

As shown schematically in FIG. 2, the two magnetic fields 8 simultaneously pulse the pulse wire sensor 5. This results in a superposition of the individual magnetic fields of the magnets 4, a large field component parallel to the axis forming which reliably actuates the sensor, the overall stray field outwards being small.

Due to the embedding of the bar-shaped magnets 4 in the measuring wheel shaft 3, the area interspersed by the magnetic flux is kept to a minimum. As the rotational axis passes through the magnets 4, only a small area is intersected during rotation so that eddy currents are minimised.

What is claimed is:

1. A measuring arrangement for contactless measurement of the rotational speed of a component arranged on a shaft, comprising two magnets which revolve about a rotational axis and are aligned parallel to each other such that their poles (N, S) are radially aligned, said magnets having opposite polarity;

a stationary pulse wire sensor which is disposed in the magnetic fields of said magnets and is parallel to said rotational axis;

said magnets being arranged at an axial distance to each other such that their individual magnetic fields are superimposed and form a field component at least sufficient to actuate said pulse wire sensor and parallel to said rotational axis.

2. A measuring arrangement according to claim 1 wherein, the magnets are embedded in the shaft of the component.

* * * * *